United States Patent Office 3,269,974

Patented August 30, 1966

3,269,974

POWDERED EPOXY RESIN COMPOSITIONS

William I. Childs, Portville, N.Y., assignor to Hysol Corporation, Olean, N.Y., a corporation of New York No Drawing. Filed June 25, 1963, Ser. No. 290,304
6 Claims. (Cl. 260—37)

This invention relates to epoxy resin compositions in the form of finely divided free-flowing powders adapted for fluidized bed and dry spray application to heated objects. More particularly, the invention relates to epoxy resin compositions which, by reason of an unique combination of two different type epoxy resins with a normally solid anhydride catalyst, provide, on application to heated objects, coatings which have both good electrical resistance and high physical strength at elevated temperatures.

While the loss of physical strength at elevated temperatures presents problems in a number of instances where the use of epoxy resin coatings might otherwise be indicated, this problem shows up quite dramatically in the insulation of parts of electrical equipment, such as armatures, stators, rotors, and the like. The wire windings applied to such parts over the insulation are applied under tension, and the parts in their normal operation are frequently subjected to substantially elevated temperatures. Experience has shown that with conventional epoxy coatings as insulation on such parts, there is a tendency for the insulating coating to be cut or broken by the stress put on it by the wire windings, thereby electrically short-circuiting out the part.

In considering the suitability of epoxy resin coatings for electrical parts of the type described, a useful measure of capacity to resist break-down of the type mentioned is the "cut-through temperature" of a coating formed from a particular material. Cut-through temperature is determined by a test procedure which can be described as follows:

A ½" x ½" x 5" steel bar is coated to a thickness of 10–25 mils on the flat surface and 5–15 mils on an edge. This is supported at the ends on a steel frame in an oven in a horizontal position. A 20 mil thick copper wire is draped over the bar and supports a 1 lb. weight on each end of the wire. In this position the pressure of the wire and weights is borne on the edges of the bar. An electrical connection is made so that a potential circuit can be made through a buzzer which will ring when the circuit is completed. The circuit runs through the buzzer, the wire supporting the weight and the coated bar. The circuit is broken by the coating which serves its function as electrical insulation. A thermocouple is insered in a hole drilled into the bar and the temperature of the bar is measured rather than the temperature of the air in the oven. The temperature of the oven is increased at the rate of 6–8° F. per minute until a temperature is reached at which the coating softens thermally enough to allow the pressure exerted by the wire to cut-through the coating—thus completing the electrical circuit and causing the buzzer to ring. The temperature of the bar is then recorded as the cut-through temperature.

A high cut-through temperature means that the coating can stand higher temperature and still provide good electrical insulation. Conventional epoxy coating compositions which are otherwise suitable as electrical insulating materials show cut-through temperatures by the above test consistently below tbout 370° F., and sometimes as low as 300° F. In contrast to this, the coatings prepared from the new compositions according to the present invention show cut-through temperatures consistently in excess of about 450° F., and generally in excess of 475° F., thus indicating the superiority of the new compositions not only for insulation of electrical parts of the type described, but also for related coating application where the retention of physical strength at elevated temperatures is a necessary or desirable property.

Solid epoxy resins made from Bisphenol A and epichlorohydrin are well known in the art. These materials have a functionality (average number of epoxide groups per molecule) in excess of 1, and generally about 2. They vary considerably in molecular weight and softening point, and for the purpose of the present invention, those resins having molecular weights within the range of about 900 to 10,000, and softening point within the range of about 60° to 140° C. can be effectively used. In the new compositions, however, it is essential to employ as a second epoxy resin, a novalac based epoxy resin in the proportions of about one part to 1–20 parts by weight of the Bisphenol based resins.

Solid epoxidized novalac resins are also well known in the art and commercially available. Their preparation by reaction of epichlorohydrin with phenol-formaldehyde resins containing reactive —OH groups is disclosed in U.S. Patent No. 2,658,885. These solid resins have a functionality greater than 2, and frequently as high as 6 to 7. For the purpose of the present invention, the novalac based epoxy resins should have a molecule weight within the range of about 500 to 1500 with a functionality of about 3 to 7, and further should have a softening point within the range of about 30° to 120° C.

The particular selection and proportions of the two resins should be such that a fused mixture of the resins will have a softening point above about 70° C. As will be hereinafter explained, a preferred manner of formulating the new compositions involves fusing together the two resins prior to grinding to a finely divided solid. On the other hand, if compositions are prepared by merely mixing together the two type powdered resins without fusing, then, both of the resins selected should preferably have a softening point above 70° C.

As harder or curing agent for the combined resins, the new compositions contain a solid anhydride or polyanhydride melting about above 50° C. Typical hardners of this type which are readily available include:

(a) Pyromellitic dianhydride
(b) Benzophenone dianhydride
(c) Trimellitic anhydride
(d) Phthalic anhydride
(e) Hexachloro endo methyl tetra hydrophthalic anhydride
(f) Ethylene glycol bis trimellitate anhydride
(g) Glycerol bis trimellitate anhydride
(h) Glycerol tris trimellitate anhydride.

Of these, the di and tri anhydrides, items b, f, g, and h, in the foregoing tabulation are particularly desirable, since the added crosslinkage effected in curing further enhances the high temperature strength of the cured coating. Compositions containing dry mixtures of resin and anhydride exhibit good shelf stability, while at the same time facilitating rapid curing of the compositions at temperatures of the order of 200° C.

The proportion of hardner in the composition is preferably 0.5 to 1.25 equivalents of anhydride per epoxy equivalent. (An equivalent of the anhydride is understood to mean the grams of anhydride containing one gram equivalent of anhydride radical; and an epoxy equivalent is understood to mean the grams of resin which contain one gram equivalent of epoxide radical.) This corresponds to about 0.15 to 0.4 part of anhydride for each part by weight of the total resins. In instances where a clear coating in desired, the resins and hardener can make up the complete composition. It is generally desirable, however, in order to provide opacity and/or color in the coating, to enhance the high temperature properties of the coating and/or to reduce the overall cost of the coating, that the compositions include filler components such as inert mineral fillers and pigments. Pigments are, of course, used to obtain a desired color, and are generally present in relatively low concentrations. The basic limitation on the pigment type is that it should be stable to temperatures of 200 to 225° C. for at least an hour to provide for normal curing conditions. Typical pigments which may be used are phthalocyanine blues and greens, mercury-cadmium and iron oxide reds, and titanium dioxide white. It will be understood, however, that any pigment compatible with epoxy resins, and having the temperature stability above mentioned, can be used for imparting desired color to the compositions and resulting coatings.

Inert mineral fillers, in addition to reducing the cost of the compositions, tend to enhance the physical properties of coatings formed with the compositions, and particularly to enhance the flow properties as the powdered compositions are applied to and cured on heated objects. Typical inert fillers include mica, silica, silicates, talcs, barytes, and the like, with very finely divided silica being particularly beneficial in enhancing the flow characteristics. It is to be understood, however, that other inert fillers which have good electrical insulation properties and which are stable to temperatures of the order of 400 to 500° C. can be employed.

The filler components should be quite finely divided, preferably having a particle size finer than 325 mesh. These filler components can be present in a wide range of proportions, including proportions greater than the combined resin and hardener components, but should not exceed about 70% by weight of the total formulations.

In producing the new compositions, the several individual resin, hardener, and filler components can be combined by first individually grinding the resins and curing agent so that substantially all particles are finer than 80 mesh, and then blending with the filler components, as for example, in a pebble or ball mill until an intimate mixture is obtained. It is preferred, however, to mix the resins and the bulk of the filler components, including pigment, in such a way that the resins actually coat and wet the fillers. This not only improves the appearance of the final coating, but also improves its homogeneity. This mixing can be done by melting the resins in a suitable kettle, stirring in the solid filler components until a homogeneous mixture is obtained, cooling this mixture preferably in shallow layers, and then grinding it to a fine, less than 80 mesh, powder in which individual particles will constitute a mixture of the several components. Alternatively, such mixing can be effected by fluxing the resins and filler components on a two-roll plastics mill until a homogeneous mixture is obtained, and then cooling and grinding as above described.

Mixed resin-filler particles prepared by either the melting or fluxing procedures above mentioned are then blended with the curing agent (ground so that substantially all will pass through an 80 mesh screen) and special flow control material such as finely divided silica, if present, by means of a ball or pebble mill. Milling should be continued for at least 2 hours and suitably for about 2 to 6 hours. More extended milling will lead to smaller particle size in the powder and enhanced smoothness in coatings formed therewith, and may be desirable for some uses and applications of the new compositions. For best performance in fluidized bed application, the particle size should be primarily within the range of 5 to 400 microns.

In some instances it may be desirable to include modifier components in the compositions. Such modifier components should have melting points in excess of about 70° C., and include materials, such as polyethylene glycol having a molecular weight of about 4,000, or polyvinyl butyral. When preparing the compositions by the melting or fluxing procedures above mentioned, such modifier components are combined with the melted resins, or fluxed with the resin and filler components.

The new compositions can be applied to articles by various procedures, such as dry spraying onto heated articles, flame spraying, or by dipping heated articles in a fluidized bed of the composition. The latter procedure is particularly effective in providing relatively uniform coatings on undercut and inaccessible areas of irregular articles, such as armatures, stators, rotors, and the like. For fluidized bed coating, the article is merely heated to about 200° C., and immersed in a fluidized bed of the composition for a few seconds to permit the desired amount of composition to become fused to the article. When the article is one of substantial bulk, the latent heat may be sufficient to effect complete cure of the composition. When coating articles of less bulk from which the heat may be dissipated more rapidly, supplemental heating in an oven of about 200–225° C. for periods of about 10 to 30 minutes may be required to complete the cure which is initiated as the composition fuses to the article.

The following examples will serve to illustrate how typical compositions in accordance with the present invention can be prepared, but it is to be understood that these examples are given by way of illustration and not of limitation. In order to simplify the examples, the resins used therein will be identified by reference to the following tabulation:

| Resin | Type | Softening Point, ° C. | Approx. Mol. Wt. | Epoxy Equivalent |
|---|---|---|---|---|
| B-1 | Bisphenol A | 95-105 | 1,840 | 825-1,025 |
| B-2 | do | 95-105 | 1,880 | 860-1,015 |
| B-3 | do | 125-135 | 4,500 | 2,000-2,500 |
| N-1 | Novolac | 75-85 | 1,080 | 220-230 |
| N-2 | do | 95-105 | 1,270 | 230-240 |

*Example 1*

A powdered coating composition is prepared by melting together at 150–175° C. 100 gm. of resin B–3 and 54 gm. of resin N–2, adding to the melt 154 gm. of silica (325 mesh) and mixing until uniform. This mixture is then cooled to a solid, broken up and ground to less than 80 mesh. This powder, together with 58 gm. of glycerol tris trimellitate anhydride (ground to less than 80 mesh) and 1.5 gm. of colloidal silica are blended for 2 hours in a ball mill to form a homogeneous free-flowing powder.

A quantity of this powder was placed in a fluidized bed apparatus, expanded to a fluidized bed by passing air therethrough and a steel substrate, preheated to 210° C., was dipped into the the bed, causing powder to fuse to the immersed surfaces. After removal the coating was cured for 10 minutes in a 210° C. oven. The resulting coating was smooth and continuous and was about 16 mils thick on a flat surface. The cut-through temperature as determined by the procedure herein described, was greater than 475° F., i.e. the coating did not cut through at 475° F. At a 21 mil thickness of the coating the dielectric strength was greater than 17,000 volts.

*Example 2*

A powdered coating composition is prepared by first blending together by fluxing on a hot 2-roll plastics mill 100 gm. of resin B–3, 67 gm. of resin N–2, 292 gm. of barytes (325 mesh) and 0.7 gm. of phthalocyanine blue pigment. This blend, after cooling and solidifying, is ground to less than 80 mesh, and mixed with 46 gm. of ethylene glycol bis trimellitate anhydride (pulverized to less than 80 mesh) and 0.5 gm. of colloidal silica by blending in a ball mill for 5 hours.

When a steel substrate, preheated to 200° C., is dipped in a fluidized bed of this powder and cured for 10 minutes in a 200° C., oven, a smooth, continuous dark blue coating is produced, having a cut-through temperature in excess of 480° F.

*Example 3*

Following the procedure of Example 2, 100 gm. of resin B–1, 100 gm. of resin N–2, 300 gm. of silica (325 mesh) and 1.6 gm. of phthalocyanine blue pigment were blended together and pulversized, and then mixed for 4 hours in a ball mill with 67 gm. of glycerol tris trimellitate anhydride and 1.0 gm. of colloidal silica to form a homogeneous free-flowing powder.

A metal bar preheated to 195° C. was dipped in a fluidized bed of this powder and cured for 30 min. at 195° C. A smooth, dark blue continuous coating was obtained having a cut-through temperature in excess of 475° F.

*Example 4*

A powdered coating composition is prepared by first blending together by fluxing on a hot 2-roll plastics mill 100 gm. of resin B–1, 100 gm. of resin N–2, 300 gm. of silica (325 mesh), 4 gm. of phthalocyanine green pigment, and 4 gm. of polyvinyl butyral (Butvar B–76), the latter acting as a modifier and flow control agent. This blend is cooled, ground to less than 80 mesh, mixed with powdered trimellitic anhydride (80 mesh), and the mixture blended for 2 hours in a ball mill.

When a steel substrate preheated to 200° C., is dipped in a fluidized bed of this powder and cured for 20 min. at 200° C., a smooth, dull green, continuous coating is obtained having a cut-through temperature in excess of 450° F.

*Example 5*

A powdered coating composition is prepared by first fluxing on a hot 2-roll plastics mill 100 gm. of resin B–2, 9.7 gm. of resin N–2, 166 gm. of barytes (325 mesh), 0.35 gm. of phthalocyanine blue pigment, and 1.1 gm. of titanium dioxide white pigment. This blend is cooled, ground to less than 80 mesh, mixed with 19 gm. of glycerol tris trimellitate anhydride (80 mesh) and 1.4 gm. of colloidal silica, and the mixture is blended for 2 hr. in a ball mill.

When a steel substrate preheated to 200° C., is dipped mersed in a fluidized bed of this powder and cured for 15 min. at 200° C., a smooth, continuous, medium blue coating is obtained which has a cut-through temperature in excess of 480° F.

*Example 6*

A powdered coating composition is prepared by first fluxing on a hot 2-roll plastics mill 100 gm. of resin B–1, 22 gm. of resin N–2, 246 gm. of barytes (325 mesh), and 1.8 gm. of iron oxide red pigment. This blend is cooled, ground to less than 80 mesh, mixed with 29 gm. of benzophenone dianhydride (80 mesh) and 1.1 gm. of colloidal silica, and the mixture is blended for 2 hr. in a ball mill.

Coatings of this powder, applied as previously described and cured for 30 minutes at 200° C., show a cut-through temperature in excess of 480° F.

*Example 7*

A powdered coating composition is prepared by first fluxing on a hot 2-roll plastics mill 100 gm. of resin B–1, 33 gm. of resin N–1, 262 gm. of barytes (325 mesh) and 4 gm. of iron oxide red pigment. This blend is cooled, ground to less than 80 mesh, mixed with 30 gm. of glycerol bis trimellitate anhydride (80 mesh) and 1 gm. of colloidal silica, and the mixture is blended for 2 hr. in a ball mill.

Coatings of this powder, applied as previously described and cured for 20 min. at 200° C., show a cut-through temperature in excess of 480° F.

As previously described the proportions of Bisphenol A based resin to novolac based resin in the new compositions can vary from about 1:1 to 20:1. The selection of a preferred ratio for a particular purpose may depend on physical properties desired in addition to high temperature strength of high cut-through temperatures. As a general guide, it should be noted that as the novolac resin approaches or is increased beyond the 1:1 ratio, there is an increasing tendency for the resulting coatings to be more brittle. Thus, the 1:1 proportion represents a practical upper limit on the amount of novolac resin for most coating compositions. At the other end of the range, i.e. when decreasing the proportion of novolac resin, the 20:1 ratio is not a well defined end point. Much smaller amounts of novolac resin can be used and still provide sufficient improvement in the high temperature properties as compared with unmodified Bisphenol A type resin. The 20:1 ratio does represent a practical limit, however, when high cut-through temperature is a property particularly desired in a coating composition.

Various changes and modifications in the compositions and formulating procedures herein disclosed will occur to those skilled in the art, and to the extent that such changes and modifications are embraced by the appended claims, they constitute part of the present invention.

I claim:

1. A resin composition for producing coatings which retain high physical strength at elevated temperatures, said composition being in the form of a free-flowing powder adapted for fluidized bed and dry spray application to heated objects to coat such objects, said powder having a particle size primarily within the range of 5 to 400 microns and comprising a mixture of Bisphenol A based epoxy resin, which is a reaction product of Bisphenol A and epichlorohydrin having more than 1 epoxy group per molecule, a molecular weight within the range of about 900 to 10,000 and a softening point within the range of about 60° to 140° C., and novolac based epoxy resin, having a molecular weight within the range of about 500 to 1500, a functionality of about 3 to 7, and a softening point within the range of about 30° to 120° C., in proportions by weight within the range of 1:1 to 20:1 and such as to provide, for a fused mixture thereof, a softening point above about 70° C., a hardener selected from the group consisting of ethylene glycol bis trimellitate anhydride, glycerol bis trimellitate anhydried, glycerol tris trimellitate anhydride, benzophenone dianhydride, and trimellitic anhydride in the proportion of about 0.5 to 1.25 equivalents of anhydride per epoxy equivalent of said resins and filler components in the proportion of 0 to 70% of said composition.

2. A resin composition as defined in claim 1 wherein the hardener is ethylene glycol bis trimellitate anhydride.

3. A resin composition as defined in claim 1 wherein the hardener is gylcerol bis trimellitate anhydride.

4. A resin composition as defined in claim 1 wherein the hardener is glycerol tris trimellitate anhydride.

5. A resin composition as defined in claim 1 wherein the hardener is benzophenone dianhydride.

6. A resin composition as defined in claim 1 wherein the hardener is trimellitic anhydride.

References Cited by the Examiner

UNITED STATES PATENTS

| | | | |
|---|---|---|---|
| 2,730,467 | 1/1956 | Daszewski | 260—831 |
| 2,801,989 | 8/1957 | Farnham. | |
| 2,941,981 | 6/1960 | Elbling et al. | |
| 2,948,171 | 8/1960 | Belanger et al. | |
| 2,991,293 | 7/1961 | Batzer et al. | |
| 3,028,251 | 4/1962 | Nagel | 117—21 |
| 3,051,681 | 8/1962 | Partansky. | |
| 3,058,951 | 10/1962 | Flowers et al. | 260—45.5 |
| 3,100,756 | 8/1963 | Fry | 260—830 |
| 3,102,043 | 8/1963 | Winthrop. | |
| 3,102,823 | 9/1963 | Manasia et al. | |

MORRIS LIEBMAN, *Primary Examiner.*

ALEXANDER H. BRODMERKLE, *Examiner.*

J. W. BEHRINGER, J. E. CALLAGHAN, *Assistant Examiners.*